US010634867B2

(12) United States Patent
Lim et al.

(10) Patent No.: US 10,634,867 B2
(45) Date of Patent: Apr. 28, 2020

(54) CAMERA MODULE

(71) Applicant: SAMSUNG ELECTRO-MECHANICS CO., LTD., Suwon-si (KR)

(72) Inventors: Soo Cheol Lim, Suwon-si (KR); Jae Hyuk Kim, Suwon-si (KR); Oh Byoung Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/950,126

(22) Filed: Nov. 24, 2015

(65) Prior Publication Data

US 2016/0154204 A1   Jun. 2, 2016

(30) Foreign Application Priority Data

Nov. 28, 2014 (KR) .................. 10-2014-0169135
Dec. 1, 2014 (KR) .................. 10-2014-0169923
Jun. 10, 2015 (KR) .................. 10-2015-0081881

(51) Int. Cl.
*G02B 7/08* (2006.01)
*G02B 27/64* (2006.01)

(52) U.S. Cl.
CPC .............. *G02B 7/08* (2013.01); *G02B 27/646* (2013.01)

(58) Field of Classification Search
CPC .......... G02B 27/64–646; G02B 27/646; G02B 7/08; G02B 7/00; G02B 7/02; G02B 7/04; H04N 5/222–2286
USPC ................................................ 359/554–557
See application file for complete search history.

(56) References Cited

U.S. PATENT DOCUMENTS

| 9,766,426 | B2 * | 9/2017 | Lam ......................... G02B 7/09 |
| 2009/0268319 | A1 | 10/2009 | Woo et al. |
| 2011/0176046 | A1 | 7/2011 | Hu et al. |
| 2012/0219276 | A1 * | 8/2012 | Suzuka ............... G02B 27/646 |
| | | | 396/55 |
| 2012/0320467 | A1 | 12/2012 | Baik et al. |
| 2014/0160311 | A1 | 6/2014 | Hwang et al. |
| 2014/0362284 | A1 | 12/2014 | Shin et al. |

(Continued)

FOREIGN PATENT DOCUMENTS

| CN | 102062926 A | 5/2011 |
| CN | 202841335 U | 3/2012 |

(Continued)

OTHER PUBLICATIONS

Korean Office Action dated Nov. 29, 2016, in counterpart Korean Application No. 10-2015-0081881 (7 pages in English, 5 pages in Korean).

(Continued)

*Primary Examiner* — William R Alexander
(74) *Attorney, Agent, or Firm* — NSIP Law (57) ABSTRACT

A camera module having a case coupled to a base part to form an internal space; a lens module disposed in the internal space; and an auto-focusing driving part comprising a first magnet attached to one surface of the lens module and a first coil disposed to face the first magnet, wherein the base part has a first board on which an image sensor is disposed, and a fixing part on one side portion of the base part and extending from the base part in an optical axis direction, and wherein other side portions of the base part exclude the fixing part.

21 Claims, 7 Drawing Sheets

(56) References Cited

U.S. PATENT DOCUMENTS

2015/0319345 A1 11/2015 Park
2016/0109681 A1* 4/2016 Lam .................. G02B 7/09
              359/824

FOREIGN PATENT DOCUMENTS

| CN | 103869445 A | 6/2014 |
|---|---|---|
| JP | 2008-304850 A | 12/2008 |
| KR | 10-2009-0112319 A | 10/2009 |
| KR | 10-2011-0086935 A | 8/2011 |
| KR | 10-2013-0053740 A | 5/2013 |
| KR | 10-2014-0076213 A | 6/2014 |
| KR | 10-2014-0078018 A | 6/2014 |
| KR | 10-2014-0144126 A | 12/2014 |
| WO | WO 2014/092271 A1 | 6/2014 |

OTHER PUBLICATIONS

Korean Office Action dated May 3, 2016 in counterpart Korean Application No. 10-2015-0081881 (13 pages in Korean with English translation).
Chinese Office Action dated Dec. 25, 2017 in corresponding Chinese Patent Application No. 201510856822.4. (12 pages in English and 7 pages in Chinese).

* cited by examiner

CAMERA MODULE

CROSS-REFERENCE TO RELATED APPLICATIONS

This application claims the benefit under 35 USC 119(a) of Korean Patent Application Nos. 10-2014-0169135 filed on Nov. 28, 2014, 10-2014-0169923 filed on Dec. 1, 2014, and 10-2015-0081881 filed on Jun. 10, 2015, in the Korean Intellectual Property Office, the disclosures of which are incorporated herein by reference for all purposes.

BACKGROUND

1. Field

The following description relates to a camera module.

2. Description of Related Art

Camera modules have been commonly provided in mobile communications terminals, such as tablet personal computers (PC), laptop computers, and the like, as well as cellular phones, such as smartphones. A single focus type camera module imaging a subject with a fixed focus is commonly used for mobile communications terminals. However, recently, in accordance with the further development of imaging technology, a camera module including an auto-focusing (AF) actuator allowing auto-focusing to be performed has been adopted for use in mobile communications terminals.

In addition, in order to prevent deterioration of image quality due to hand-shake at the time of capturing an image with the camera module, an optical image stabilization (OIS) actuator, to which an OIS technology for correcting the hand-shake is applied may be used. A voice coil motor is one type of actuator used for AF and OIS, generating a driving force through interaction between a magnet and a coil.

Here, a printed circuit board supplies supply power to the AF and OIS actuators. However, there may be a problem with such a configuration in that the camera module may be increased in size due to the inclusion of a fixing structure for fixing the printed circuit board to the interior of the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module in which demand for miniaturization may be satisfied, and reliability against external impacts may be secured and the generation of driving displacement at the time of correcting hand-shake may be prevented.

In another general aspect, a camera module having a case coupled to a base part to form an internal space; a lens module disposed in the internal space; and an auto-focusing driving part comprising a first magnet attached to one surface of the lens module and a first coil disposed to face the first magnet, wherein the base part has a first board on which an image sensor is disposed, and a fixing part on one side portion of the base part and extending from the base part in an optical axis direction, and wherein other side portions of the base part exclude the fixing part.

In another general aspect, a camera module having a base part coupled to a first board on which an image sensor is disposed; a case coupled to the base part to provide an internal space; a lens module disposed in the internal space, wherein three magnets are disposed on side surfaces of the lens module; and three coils disposed to face the three magnets in a direction perpendicular to an optical axis, wherein one of the three coils is mounted on the base part and the other coils are mounted on the case.

Other features and aspects will be apparent from the following detailed description, the drawings, and the claims

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second element disposed above a first element based on the orientation of the device illustrated in the drawings also encompasses the device when the device is flipped upside down in use or operation, Hereinafter, terms with respect to directions will be defined. As viewed in FIG. 1, an optical axis direction (Z direction) refers to a vertical direction in relation to a lens module 20, a first direction (X direction) refers to a direction perpendicular to the optical axis direction (Z direction), and a second direction (Y direction) refers to a direction perpendicular to both the optical axis direction (Z direction) and the first direction (X direction).

Figure 1:
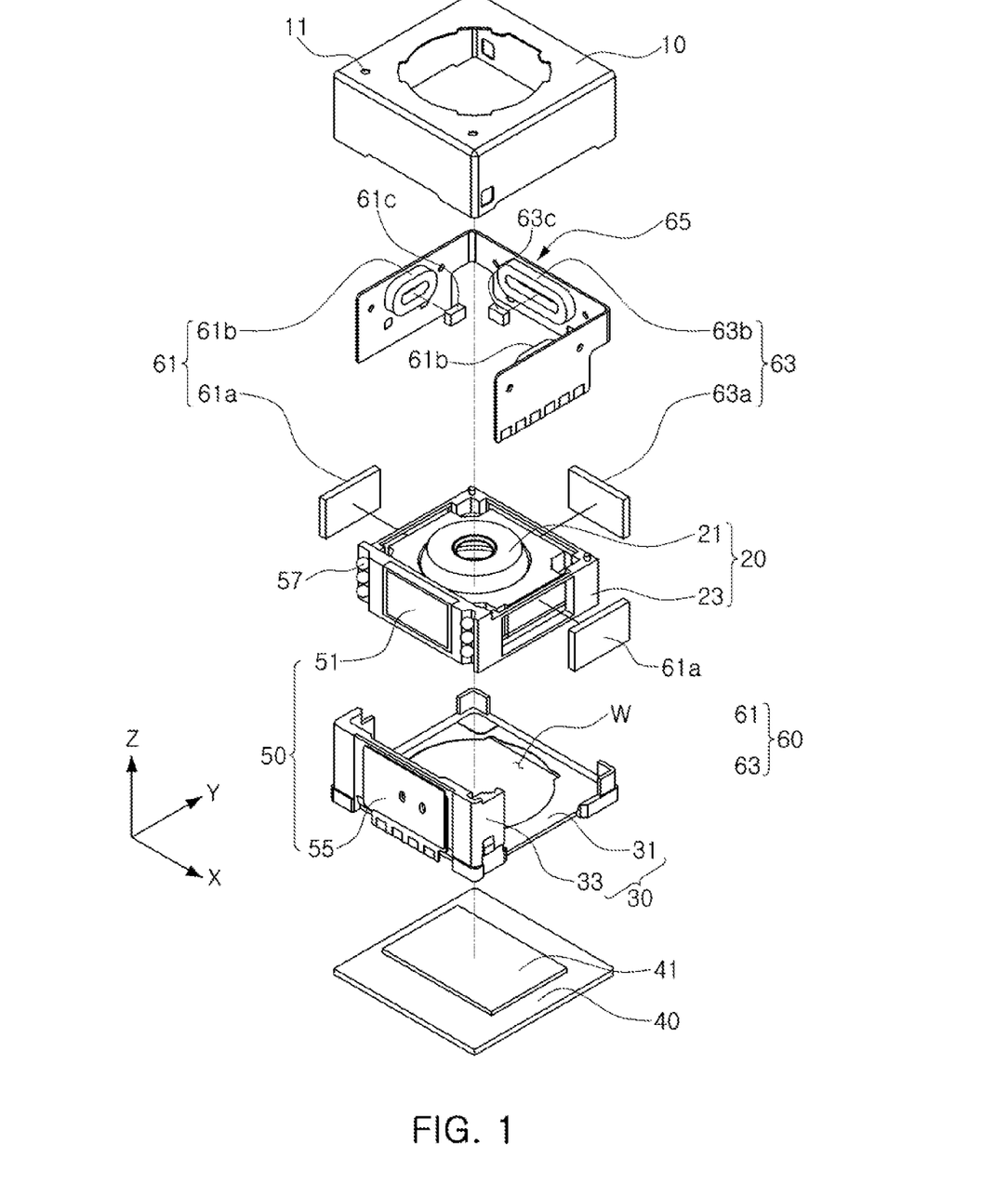
FIG. 1 is an exploded perspective view of an example of a camera module.

Referring to FIG. 1, the camera module includes a lens module 20, a base part 30, and a case 10. The lens module 20 includes a lens barrel 21 and a holder 23 accommodating the lens barrel 21 therein. The lens barrel 21 has a hollow cylindrical shape wherein a plurality of lenses for imaging a subject are disposed. The plurality of lenses are provided in the lens barrel 21 along an optical axis. The plurality of lenses have optical characteristics such as the same or different reflective indices, and are stacked according to a design of the lens barrel 21. Additionally, the number of lenses may vary according to the design of the lens barrel 21.

The lens barrel 21 is accommodated in the holder 23. For example, the lens barrel 21 is inserted into a hollow part provided in the holder 23. The holder 23 is configured to move with the lens barrel 21 along the optical axis. To this end, an auto-focusing driving part 50 is provided. The lens module 20 may move in the optical axis direction (Z direction) through the auto-focusing driving part 50, whereby an auto-focusing function or a zoom function may be enabled.

In order to correct blurring of an image or shaking of video footage due to various factors including user hand-shake at the time of capturing an image or at the time of capturing video footage, a hand-shake correcting part 60 is provided. The hand-shake correcting part 60 enables the lens barrel 21 to move in the first direction (X direction) and the second direction (Y direction). For example, the hand-shake correcting part 60 provides relative displacement corresponding to the hand-shake to the lens barrel 21 when user hand-shake occurs at the time of capturing an image, thereby compensating for hand-shake. The hand-shake correcting part 60 includes a first hand-shake correcting part 61 moving the lens barrel 21 in the first direction (X direction) and a second hand-shake correcting part 63 moving the lens barrel 21 in the second direction (Y direction).

The base part 30 is provided below the lens module 20, and a first board 40 on which an image sensor 41 is mounted is provided below the base part 30. The base part 30 is provided with a window W to allow light passing through the lenses provided in the lens barrel 21 to pass through the base part 30.

A second board 55 is mounted on one side of the base part 30 in order to supply power to the auto-focusing driving part 50. The case 10 is coupled to the base part 30 to provide an internal space, and the lens module 20 is accommodated in the internal space. The case 10 is coupled to the base part 30 to enclose an outer surface of the lens module 20, and serves to shield electromagnetic waves generated during driving of the camera module. For example, when the camera module is driven, electromagnetic waves are generated, and externally discharged. The externally discharged electromagnetic waves may influence other electronic components to cause a communications error or a malfunction through interference.

To shield the electromagnetic waves, the case 10 may be formed of a metal and be grounded by a ground pad provided on the first board 40. In addition, the case 10 may be formed of injection-molded plastic, and a conductive paint or material may be applied to an inner surface of the case 10 to shield the electromagnetic waves. The conductive paint may be a conductive epoxy, but is not limited thereto. That is, various materials having conductivity may be used in the conductive paint, and a conductive film or conductive tape may also be used.

A third board 65 provides power to the hand-shake correcting part 60 is disposed on the inner surface of the case 10.

The auto-focusing driving part 50 includes a first magnet 51 and a first coil 53 (shown in FIGS. 3 and 4) facing the first magnet 51. In addition, the auto-focusing driving part 50 further includes a first hall sensor 54 sensing a position of the first magnet 51. The first coil 53 is disposed on the second board 55 and receives power supplied from the second board 55. In addition, the first hall sensor 54 may also be mounted on the second board 55 and be disposed at a position adjacent to the first coil 53. The first hall sensor 54 may be formed integrally with a driver integrated circuit (IC). The first magnet 51 may be attached to the lens module 20, and the first coil 53 may be disposed to face the first magnet 51 in a direction perpendicular to the optical axis direction (Z direction).

Bearing parts 57 are provided in order to support movement of the lens module 20 in the optical axis direction (Z direction). The bearing parts 57 are disposed between the base part 30 and the lens module 20 and include a plurality of ball bearings. Stoppers 11 protrude from the inner surface of the case 10 at positions corresponding to those of the bearing parts 57 in order to prevent the plurality of ball bearings from being separated.

The first hand-shake correcting part 61 includes second magnets 61a and second coils 61b disposed to face the second magnets 61a, configured to generate a driving force in the first direction (X direction). Second hall sensors 61c are provided to sense positions of the second magnets 61a. The two second magnets 61a are symmetrical to each other and two coils 61b are symmetrical to each other, in relation to the lens module 20.

The second hand-shake correcting part 63 includes a third magnet 63a and a third coil 63b disposed to face the third magnet 63a, and is configured to generate a driving force in the second direction (Y direction). A third hall sensor 63c is provided to sense a position of the third magnet 63a.

The lens barrel 21 is configured to move in the first direction (X direction) and the second direction (Y direction) within the holder 23, and is driven by the driving force generated in the first hand-shake correcting part 61 and the second hand-shake correcting part 63.

Referring to FIGS. 5-8, a frame 25 is disposed in the holder 23 to support the movement of the lens barrel 21. The frame 25 is coupled to the lens barrel 21 to allow movement in the first direction (X direction) and the second direction (Y direction).

The second magnets 61a and the third magnet 63a are attached to the frame 25, and the second coils 61b and the third coil 63b are disposed to face the second magnets 61a and the third magnet 63a, respectively, in a direction perpendicular to the optical axis direction (Z direction). The second coils 61b and the third coil 63b are mounted on the third board 65 and receive the power supplied from the third board 65. Control of the driving of the lens module will be described in detail below with reference to FIGS. 5 through 9.

Figure 2:
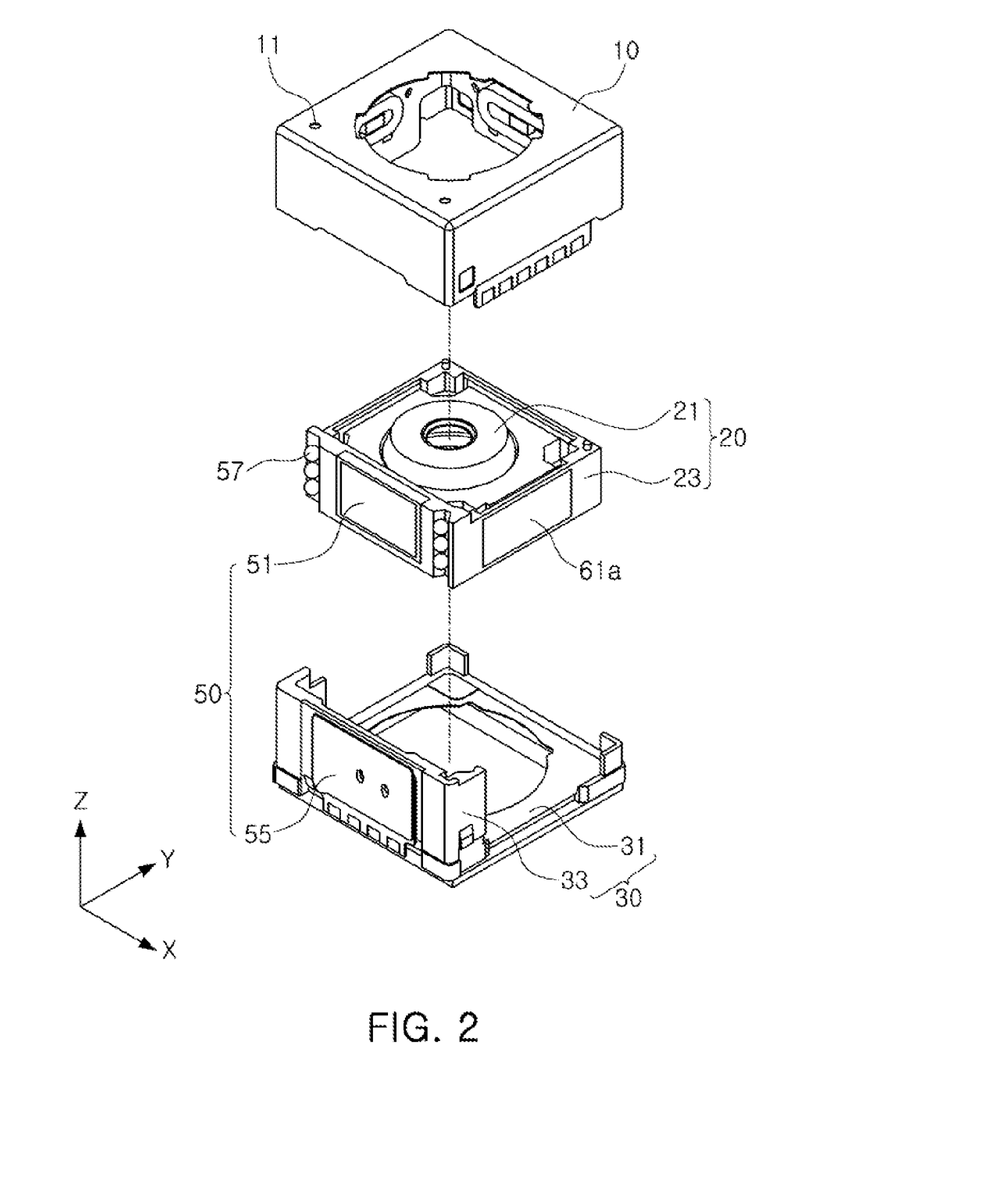
FIG. 2 is a partially assembled perspective view of the camera module.
Figure 3:
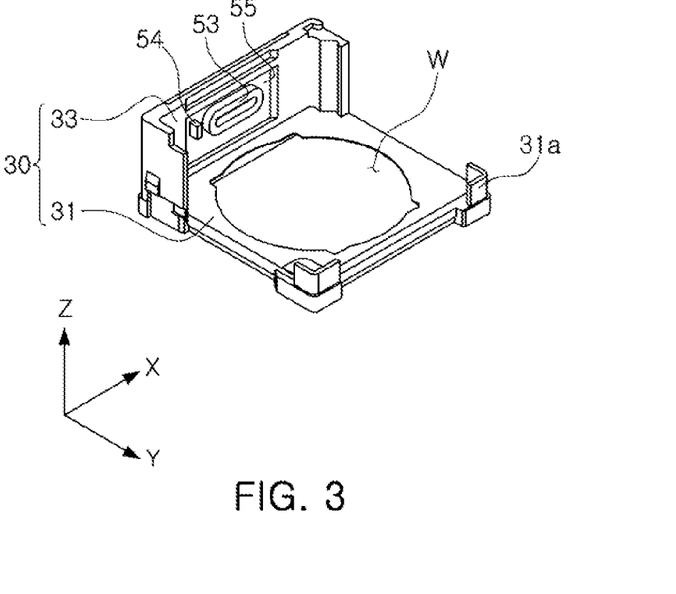
FIG. 3 is a perspective view of a base part.
Figure 4:
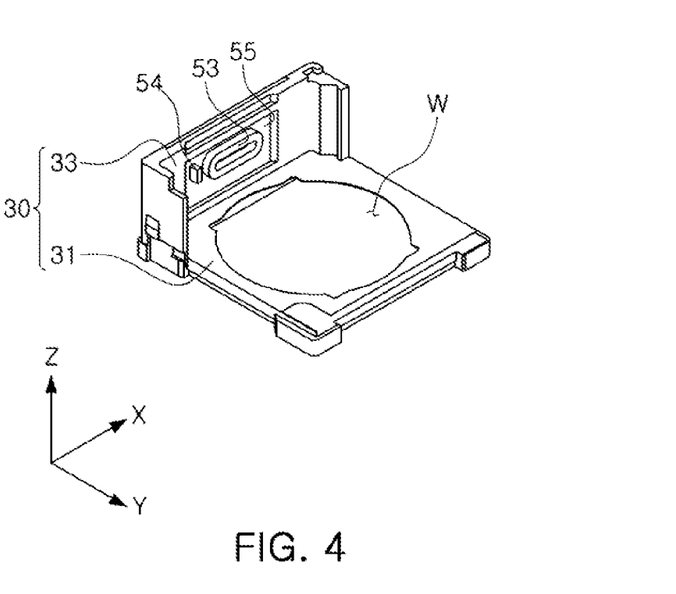
FIG. 4 is a perspective view of a base part.

Referring to FIGS. 2-4, the base part 30 includes a sensor housing 31 having a plate, or flat square, shape and a fixing part 33 extending from one side of the sensor housing 31 in the optical axis direction (Z direction). The base part 30 may further include the first board 40. The fixing part 33 extends from one side of the sensor housing 31 in the optical axis direction (Z direction) to form one side surface of the base part 30. The rest of base part 30 may be open. For example, the base part 30 has only one side surface that extends in the optical axis direction (Z direction). The fixing part 33 fixes the second board 55 to the base part 30 which provides power to the auto-focusing driving part 50. In addition, the other sides of the base part 30 are open in portions corresponding to the third board 65 which provides power to the hand-shake correcting part 60.

The window W, through which the light passing through the lenses provided in the lens barrel 21 passes, is formed in the sensor housing 31, and the second board 55 is mounted on the fixing part 33. The second board 55 is mounted on the fixing part 33, and the first coil 53 is mounted on the second board 55 to face the first magnet 51 in the direction perpendicular to the optical axis direction.

The third board 65 is disposed on the inner surface of the case 10, and the case 10 is coupled to the base part 30. Portions of the base part 30 corresponding to the third board 65 are open in the direction perpendicular to the optical axis direction, as illustrated in FIGS. 2 and 3. For example, the fixing part 33 extends from one side of the sensor housing 31 in the optical axis direction (Z direction) forms one side surface of the base part 30, and the other side surfaces of the base part 30 are open in the direction perpendicular to the optical axis direction.

The third board 65 is disposed on the inner surface of the case 10 so that the third board 65 corresponds to the open portions of the base part 30, and the second and third coils 61b and 63b correspond to the second and third magnets 61a and 63a disposed on the holder 23. Therefore, when the case 10 and the base part 30 are coupled to each other, the second magnets 61a and the second coils 61b may face each other in the X direction, perpendicular to the optical axis direction, and the third magnet 63a and the third coil 63b may face each other in the Y direction, perpendicular to the optical axis direction.

Since two magnets are provided in the first hand-shake correcting part 61 and one magnet is provided in the second hand-shake correcting part 63, the magnets provided in the hand-shake correcting part 60 are generally disposed in a '⊏' shape when viewed in the optical axis direction (Z direction). Therefore, the corresponding coils provided in the first hand-shake correcting part 61 and the second hand-shake correcting part 63 are also generally disposed in a 'C' shape when viewed in the optical axis direction (Z direction), and the third board 65 to which the second coils 61b and the third coil 63b are fixed also generally has a 'C' shape when viewed in the optical axis direction (Z direction).

Since the portions of the base part 30 corresponding to the third board 65 are open, the base part 30 may have a shape in which three side surfaces thereof corresponding to the third board 65 are open. However, the amount of magnets provided in the first hand-shake correcting part 61 and the second hand-shake correcting part 63 are not limited thereto. That is, one magnet may also be provided in each of the first hand-shake correcting part 61 and the second hand-shake correcting part 63. In this case, the magnets may be generally disposed in an 'L' shape when viewed in the optical axis direction (Z direction).

In the case in which the magnets provided in the first hand-shake correcting part 61 and the second hand-shake correcting part 63 are disposed in the 'L' shape, coils corresponding to the respective magnets are also disposed in an 'L' shape. The third board 65 to which the coils are fixed also has an 'L' shape corresponding to the magnets. In this case, two side surfaces of the base part 30 in portions corresponding to the third board 65 are open. As a result, in the camera module, side surfaces of the base part 30 in portions corresponding to the third board 65 supplying the power to the hand-shake correcting part 60 are open.

Referring to FIG. 3, corners of the open side surfaces of the base part 30 may be provided with guide protrusions 31a serving as guides when the base part 30 and the case 10 are coupled to each other. For example, since one side of the sensor housing 31 is provided with the fixing part 33, the guide protrusions 31a may be formed at the corners of the other side of the sensor housing 31. The guide protrusions 31a extend from the corners of the other side of the sensor housing 31 in the optical axis direction (Z direction), and serve to guide coupling of the case 10 and the base part 30.

However, the camera module is not limited to the configuration in which the guide protrusions 31a are formed on the base part 30. The case 10 and the base part 30 may be coupled to each other without forming the guide protrusions 31a, as illustrated in FIG. 4.

Referring to FIG. 4, the second board 55 supplying the power to the auto-focusing part 50 is attached to the base part 30, and the third board 65 supplying the power to the hand-shake correcting part 60 is attached to the case 10. For example, the second board 55 is attached to the fixing part 33 disposed on one side surface of the base part 30, and the third board 65 is disposed on the inner surface of the case 10 so that the third board 65 corresponds to the open portions of the base part 30. Therefore, when the case 10 and the base part 30 are coupled to each other, the second board 55 and the inner surface of the case 10 may have a predetermined gap formed therebetween. As a result, the second board 55, which supplies the power to the auto-focusing driving part 50, and the inner surface of the case 10 may be spaced apart from each other in the direction perpendicular to the optical axis direction (Z direction). The third board 65, which supplies the power to the hand-shake correcting part 60, and the inner surface of the case 10 are closely adhered to each other, and thereby bound to the case 10. However, the second board 55 and the inner surface of the case 10 are not limited to being spaced apart from each other, and may be slidably coupled to each other. Therefore, the second board 55 is not fixed to the inner surface of the case 10.

As described above, the third board 65 is fixed to the inner surface of the case 10, such that a separate component for fixing the third board 65 is not required in the base part 30. Therefore, the other side surfaces of the base part 30, except for one side surface thereof, are open, and the size of the base part 30 may be decreased. As a result, an overall size of the camera module according to an exemplary embodiment may be decreased, such that demand for miniaturization of the camera module may be satisfied.

Referring to FIG. 3, when the second board 55 is mounted on the fixing part 33, a through-hole having a size corresponding to that of the first coil 53 is formed in the fixing part 33 so that the first coil 53 provided on the second board 55 faces the first magnet 51. Therefore, when the second board 55 is mounted on the fixing part 33, the first coil 53 is disposed in the through-hole. As a result, upper and lower portions of the first coil 53 respectively face inner walls of the fixing part 33 that form the through-hole, in the optical axis direction (Z direction).

Referring to FIG. 2, when the case 10 and the base part 30 are coupled to each other and the third board 65 is mounted on the inner surface of the case 10. Lower portions of the second and third coils 61b and 63b provided on the third board 65 face the base part 30 (here, an upper surface of the sensor housing 31). In addition, upper surfaces of the second and third coils 61b and 63b face an inner surface of an upper portion of the case 10.

Figure 5:
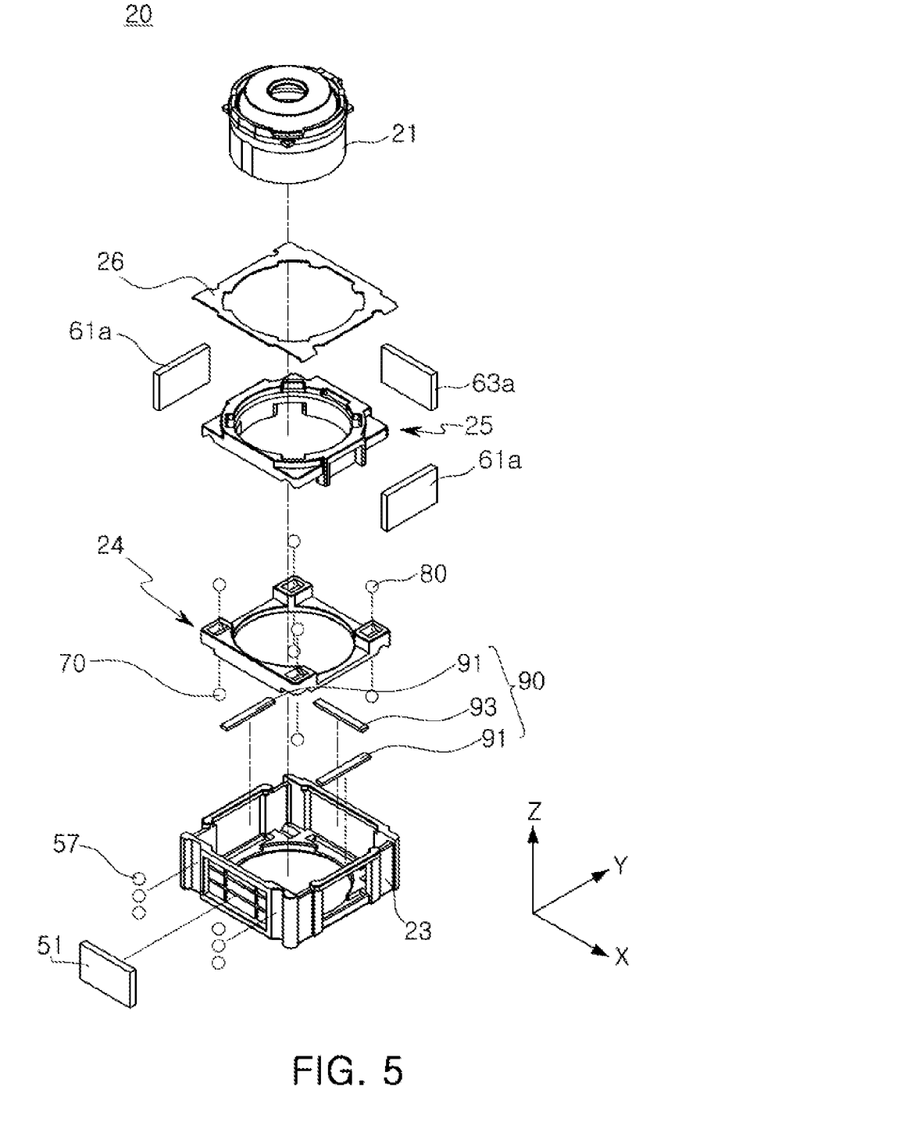
FIG. 5 is an exploded perspective view of another example of a lens module.
Figure 6:
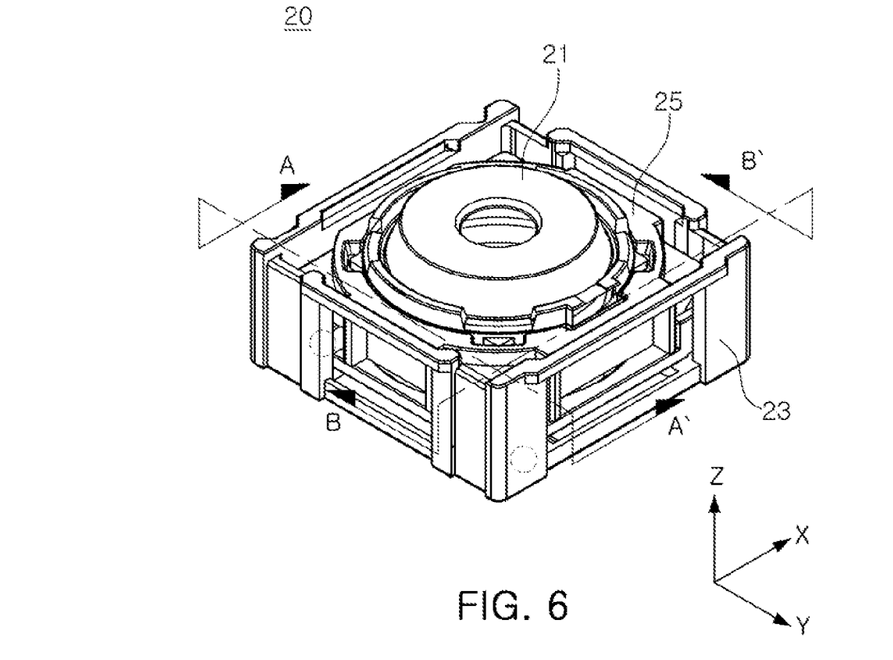
FIG. 6 is an assembled perspective view of the lens.

Referring to FIGS. 5 and 6, the lens module 20 includes the lens barrel 21 and the holder 23 accommodating the lens barrel 21 therein. In addition, at least one frame is accommodated in the holder 23 in order to support the movement of the lens barrel 21 for auto-focusing. A first frame 24 and a second frame 25 are disposed in the holder 23 aligned along the optical axis direction (Z direction), and the lens barrel 21 is coupled to the second frame 25.

The holder 23 and the first and second frames 24 and 25 are movable relative to the base part 30 and the case 10, and the first and second frames 24 and 25 are movable relative to the holder 23. To effect movement of the holder 23 and the first and second frames 24 and 25, the camera module includes the auto-focusing driving part 50 and the hand-shake correcting part 60.

The auto-focusing driving part 50 is used for the auto-focusing function or the zoom function. The lens barrel 21 is movable in the optical axis direction (Z direction) by the auto-focusing driving part 50 to thereby perform the auto-focusing function or the zoom function.

For example, the auto-focusing driving part 50 includes the first magnet 51 provided on one surface of the holder 23, the first coil 53 disposed to face the first magnet 51, and the second board 55 for applying the power to the first coil 53, and further includes the first hall sensor 54 sensing the position of the first magnet 51. The first coil 53 is mounted on the second board 55 and is disposed to face the first magnet 51, and the second board 55 is fixed to the base part 30.

The auto-focusing driving part 50 moves the holder 23 in the optical axis direction (Z direction) through electromagnetic interaction between the first magnet 51 and the first coil 53. For example, the first magnet 51 generates a magnetic field to generate a driving force through electromagnetic interaction with the first coil 53 when power and the magnetic field is applied to the first coil 53. The driving force created by the electromagnetic interaction moves the holder 23 in the optical axis direction (Z direction).

Since the first and second frames 24 and 25 are accommodated in the holder 23 and the lens barrel 21 is coupled to the second frame 25, as the holder 23 moves in the optical axis direction (Z direction), the first frame 24, the second frame 25, and the lens barrel 21 also moves in the optical axis direction (Z direction). Therefore, the holder 23, the first frame 24, the second frame 25, and the lens barrel 21 are moved in the optical axis direction (Z direction) by the auto-focusing driving part 50.

The bearing parts 57 are provided along the optical axis direction (Z direction) on one surface of the holder 23 in order to support relative movement of the holder 23 with respect to the base part 30. The bearing parts 57 are disposed at both sides of the first magnet 51 to contact an inner surface of the base part 30 and one surface of the holder 23, and are capable of rolling in the optical axis direction (Z direction).

The stoppers 11 protrude from positions corresponding to those of the bearing parts 57 on the inner surface of the case 10. The stoppers 11 prevent the bearing parts 57 from being separated between the base part 30 and the holder 23.

A separation preventing member 26 is coupled to an upper portion of the holder 23. The separation preventing member 26 prevents the first frame 24, the second frame 25, and the lens barrel 21 from being separated from the holder 23. To this end, the separation preventing member 26 may be formed of an elastic or resilient material.

The hand-shake correcting part 60 corrects blurring of an image or shaking of video footage due to factors such as user hand-shake occurring during the capturing of an image or during the capturing of video footage. For example, the hand-shake correcting part 60 provides relative displacement of the first and second frames 24 and 25 corresponding to a user hand-shake at the time of capturing an image, thereby compensating for the hand-shake. To this end, the hand-shake correcting part 60 includes the first hand-shake correcting part 61 for moving the first and second frames 24 and 25 in the first direction (X direction) and the second hand-shake correcting part 63 for moving the second frame 25 in the second direction (Y direction). The first hand-shake correcting part 61 includes the second magnets 61a and the second coils 61b disposed to face the second magnets 61a, in order to generate the driving force in the first direction (X direction), and further includes the second hall sensors 61c in order to sense the positions of the second magnets 61a. In addition, the second hand-shake correcting part 63 includes the third magnet 63a and the third coil 63b disposed to face the third magnet 63a, in order to generate the driving force in the second direction (Y direction), and further includes the third hall sensor 63c in order to sense the position of the third magnet 63a.

The second magnets 61a and the third magnet 63a are mounted on the second frame 25. The second coils 61b and the third coil 63b are disposed to face the second magnets 61a and the third magnet 63a, respectively, along a direction perpendicular to the optical axis and are mounted on the third board 65. The third board 65 is fixed to the inner surface of the case 10. The second magnets 61a and the third magnet 63a are disposed to be orthogonal with respect to each other on a plane perpendicular to the optical axis.

The first hand-shake correcting part 61 generates a driving force in the first direction (X direction) through electromagnetic interaction between the second magnets 61a and the second coils 61b. In addition, the second hand-shake correcting part 63 generates driving force in the second direction (Y direction) through electromagnetic interaction between the third magnet 63a and the second coil 63b. Therefore, the second frame 25 moves in the first direction (X direction) by the driving force of the first hand-shake correcting part 61, and moves in the second direction (Y direction) by the driving force of the second hand-shake correcting part 63.

The driving force of the first hand-shake correcting part 61 moves first frame 24 in the first direction (X direction) together with the second frame 25. However, the driving force of the second hand-shake correcting part 63 only moves the second frame 25 in the second direction (Y direction), and the first frame 24 may remain stationary.

For example, the first hand-shake correcting part 61 moves the second frame 25 together with the first frame 24, relative to the holder 23 in the X direction. However, the second hand-shake correcting part 63 moves the second frame 25 in the Y direction relative to the first frame 24.

Here, a first ball bearing part 70 is provided to support the movement of the first frame 24 and the second frame 25 relative to the holder 23, and a second ball bearing part 80 is provided to support the movement of the second frame 25 relative to the first frame 24.

Figure 7:
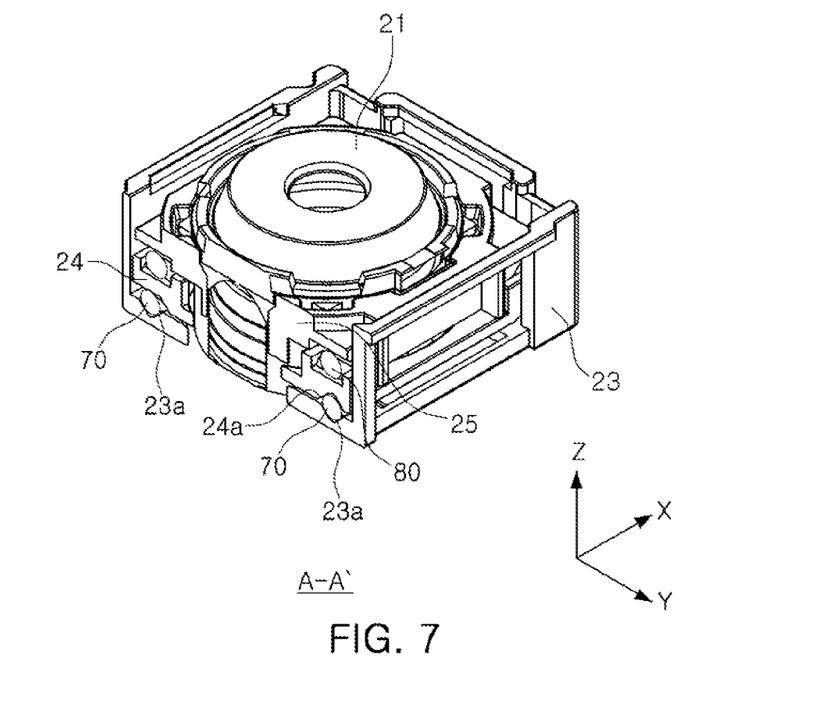
FIG. 7 is a view illustrating the interior of the lens module cut along line A-A' of FIG. 6.

Referring to FIG. 7 the first hand-shake correcting part 61 moves the first frame 24, the second frame 25, and the lens barrel 21. The first frame 24 is accommodated in the holder 23, and is movable in the first direction (X direction) by the first hand-shake correcting part 61. Here, the first ball bearing part 70 disposed between the holder 23 and the first frame 24. Although four ball bearings are provided in the first ball bearing part 70, the number of ball bearings is not limited thereto.

The first ball bearing part 70 supports the first frame 24 so that the first frame 24 moves in the first direction (X direction) while maintaining a gap between the holder 23 and the first frame 24. The holder 23 and the first frame 24 have first accommodating grooves 23a and 24a formed therein, respectively, wherein the first accommodating grooves 23a and 24a accommodate the first ball bearing part 70 therein. The first accommodating grooves 23a and 24a are formed in an inner bottom surface of the holder 23 and a lower surface of the first frame 24, respectively. The first ball bearing part 70 is fitted into the first accommodating grooves 23a and 24a so that the holder 23 and the first frame 24 are spaced apart from each other in the optical axis direction (Z direction).

Figure 8:
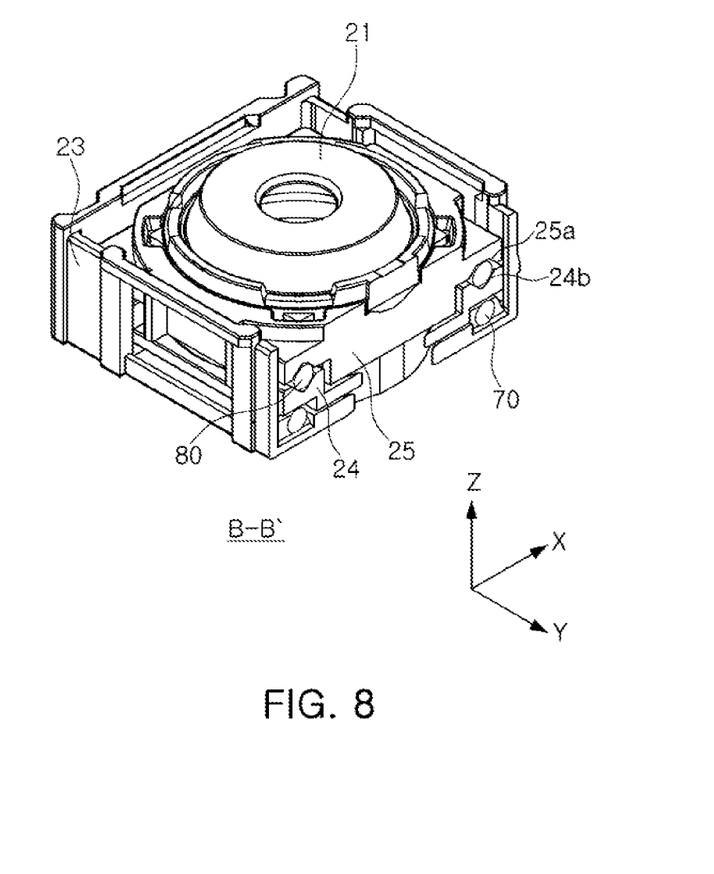
FIG. 8 is a view illustrating the interior of the lens module cut along line B-B' of FIG. 6.

The first accommodating grooves 23a and 24a guide the rolling movement of the first ball bearing part 70 in the first direction (X direction), and limit the movement of the first ball bearing part 70 in a direction perpendicular to the first direction (X direction). For example, referring to FIG. 7, a width of each of the first accommodating grooves 23a and 24a (in the Y direction) corresponds to a size of the first ball bearing part 70. Referring to FIG. 8, a length of each of the first accommodating grooves 23a and 24a (in the X direction) are sufficiently long in the first direction (X direction) to allow the first ball bearing part 70 to roll. As an example, the length of each of the first accommodating grooves 23a and 24a (in the X direction) may be greater than a diameter of each ball bearing of the first ball bearing part 70.

As such, the first ball bearing part 70 may roll in the first direction (X direction), and movement of the first ball bearing part 70 in the optical axis direction (Z direction) and the second direction (Y direction) is limited or prevented. Therefore, the first ball bearing part 70 supports the first frame 24 as it moves in the first direction (X direction) by the first hand-shake correcting part 61.

However, since the first ball bearing part 70 is fitted into the first accommodating grooves 23a and 24a and the movement of the first ball bearing part 70 in the second direction (Y direction) is limited, movement of the first frame 24 in the second direction (Y direction) is also limited, even though a driving force in the second direction (Y direction) is transferred to the first frame 24.

The second frame 25 is also accommodated in the holder 23, and moves in the first direction (X direction) with the first frame 24. That is, the first and second frames 24 and 25 move relative to the holder 23 by the first hand-shake correcting part 61, such that hand-shake correction in the first direction (X direction) is possible. Since the movement of the first ball bearing part 70 in the optical axis direction (Z direction) and the second direction (Y direction) is limited, the first and second frames 24 and 25 only move in the first direction (X direction) by the driving force of the first hand-shake correcting part 61.

Referring to FIG. 8, the second hand-shake correcting part 63 moves the second frame 25 and the lens barrel 21 in the Y direction. The first and second frames 24 and 25 are sequentially inserted into and disposed in the holder 23, and the holder 23, the first frame 24, and the second frame 25 are spaced apart from each other in the optical axis direction (Z direction), respectively.

As described above, the first and second frames 24 and 25 move in the first direction (X direction) by the first hand-shake correcting part 61. Here, the second frame 25 also moves in the second direction (Y direction) by the second hand-shake correcting part 63. The second ball bearing part 80 is disposed between the first and second frames 24 and 25. Although four second ball bearings are provided in the second ball bearing part 80 in the figures, the number of ball bearings is not limited thereto. The second ball bearing part 80 supports the second frame 25 so that the second frame 25 moves in the second direction (Y direction) while maintaining a gap with respect to the first frame 24.

The first frame 24 and the second frame 25 have second accommodating grooves 24b and 25a formed therein, respectively, wherein the second accommodating grooves 24b and 25a accommodate the second ball bearing part 80.

The second accommodating grooves 24b and 25a are formed in an upper surface of the first frame 24 and a lower surface of the second frame 25, respectively. The second ball bearing part 80 is disposed in the second accommodating grooves 24b and 25a so that the first frame 24 and the second frame 25 are spaced apart from each other in the optical axis direction (Z direction). The second accommodating grooves 24b and 25a guide the rolling movement of the second ball bearing part 80 in the second direction (Y direction), and limit the movement of the second ball bearing part 80 in the direction perpendicular to the second direction (Y direction).

For example, a width of each of the second accommodating grooves 24b and 25a (in the X direction) correspond to a size of the second ball bearing part 80, and a length of each of the second accommodating grooves 24b and 25a (in the Y direction) is sufficient in the second direction (Y direction) to allow the second ball bearing part 80 to roll. The length of each of the second accommodating grooves (in the Y direction) may be greater than a diameter of each ball bearing of the second ball bearing part 80. Therefore, when a driving force in the second direction (Y direction) is transferred to the second ball bearing part 80, the second ball bearing part 80 rolls in the second direction (Y direction), and movement of the second ball bearing part 80 in the optical axis direction (Z direction) and the first direction (X direction) is limited or prevented.

The second hand-shake correcting part 63 moves the second frame 25 in the second direction (Y direction) and is supported by the second ball bearing part 80. Therefore, the second hand-shake correcting part 63 moves the second frame 25 relative to the first frame 24, in order to correct a hand-shake in the second direction (Y direction. Since the movement of the second ball bearing part 80 in the optical axis direction (Z direction) and the first direction (X direction) is limited or prevented, the second frame 25 only moves in the second direction (Y direction) by the driving force of the second hand-shake correcting part 63. Thus, the second frame 25 moves in the first direction (X direction) and the second direction (Y direction) by the driving force of the first hand-shake correcting part 61 and the driving force of the second hand-shake correcting part 63, respectively.

For example, the driving force of the first hand-shake correcting part 61 moves the second frame 25 only in the first direction (X direction) and not the second direction (Y direction) and the optical axis direction (Z direction). The driving force of the second hand-shake correcting part 63 moves the second frame 25 only in the second direction (Y direction) and not the first direction (X direction) and the optical axis direction (Z direction).

As described above, since the first ball bearing part 70 and the second ball bearing part 80 support the first frame 24 and the second frame 25, generation of movement displacement at the time of correcting the hand-shake may be prevented. In other words, the first and second bearing parts 70 and 80 prevent unwanted displacement of the first and second frames 24 and 25 in directions orthogonal to the direction of the driving forces provided by the first and second hand-shake correcting parts 61 and 63, respectively.

Additionally, the first ball bearing part 70 allows the first frame 24 to move independently only in the first direction (X direction) when the driving force of the first hand-shake correcting part 61 is applied. The first ball bearing part 70 restricts the first frame 24 from moving independently in the second direction (Y direction) and the optical axis direction (Z direction) by, even when the driving force of the second hand-shake correcting part 63 is applied. However, the first frame 24 may move in the optical axis direction (Z direction) together with the holder 23 by the auto-focusing driving part 50. Therefore, the first frame 24 may have two degrees of freedom in the optical axis direction (Z direction) and the first direction (X direction).

The second frame 25 is driven in the first direction (X direction) together with the first frame 24 by the driving force of the first hand-shake correcting part 61, and is driven in the second direction (Y direction) by the driving force of the second hand-shake correcting part 63. The second frame 25 may also move in the optical axis direction (Z direction) together with the holder 23 by the auto-focusing driving part 50. Therefore, the second frame 25 may have three degrees of freedom in which it is movable in the optical axis direction (Z direction), the first direction (X direction), and the second direction (Y direction).

The driving forces of the first and second hand-shake correcting part 61 and 63 do not move the holder 23 However, the driving force of the auto-focusing driving part 50 moves the holder 23 in the optical axis direction (Z direction). Therefore, the holder 23 may have one degree of freedom in which it is movable in the optical axis direction (Z direction).

The driving force of the first hand-shake correcting part 61 may be greater than that of the second hand-shake correcting part 63. Since the first hand-shake correcting part 61 needs to move both the first and second frames 24 and 25, it may generate a larger driving force than that of the second hand-shake correcting part 63 which moves only the second frame 25. Therefore, the second magnets 61a provided in the first hand-shake correcting part 61 may include two magnets disposed to be symmetrical to each other, and the second coils 61b may include two coils disposed to face the two magnets, respectively.

The driving force of the auto-focusing driving part 50 may be larger than those of the first hand-shake correcting part 61 and the second hand-shake correcting part 63. Since the auto-focusing driving part 50 needs to move all of the holder 23 and the first and second frames 24 and 25, it may generate a larger driving force than that of the first hand-shake correcting part 61 and the second hand-shake correcting part 63.

Figure 9:
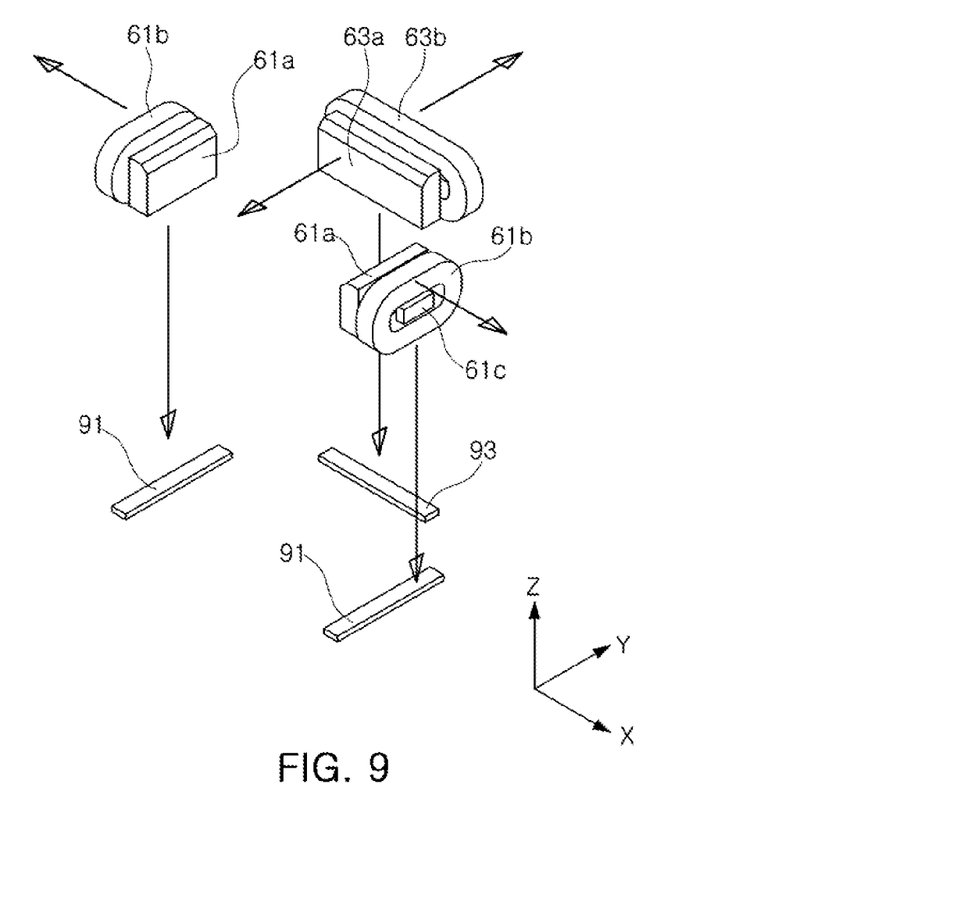
FIG. 9 is an exploded perspective view illustrating a relationship between a hand-shake correcting part and a yoke part.

Referring to FIG. 9, the camera module includes a plurality of yoke parts 90 disposed to face the hand-shake correcting part 60 in the optical axis direction (Z direction). The plurality of yoke parts 90 are disposed on the holder 23.

For example, first yoke parts 91 may be mounted on the holder 23 to face the first hand-shake correcting part 61 in the optical axis direction (Z direction), and a second yoke part 93 may be mounted on the holder 23 to face the second hand-shake correcting part 63 in the optical axis direction (Z direction). A magnetic force may act in the optical axis direction (Z direction) between the hand-shake correcting part 60 and the holder 23.

For example, since the first and second yoke parts 91 and 93 mounted on the holder 23 are formed of a magnetic material, or metal, a magnetic force interacts between the first yoke parts 91 and the first hand-shake correcting part 61, and a magnetic force also interacts between the second yoke part 93 and the second hand-shake correcting part 63. Here, magnetic force refers to electromagnetic attractive force.

Since the first and second yoke parts 91 and 93 are fixed members, the first and second hand-shake correcting parts 61 and 63 are drawn toward the first and second yoke parts 91 and 93, respectively, by the magnetic force. Therefore, the second frame 25 on which the first and second hand-shake correcting parts 61 and 63 are mounted are drawn toward the first and second yoke parts 91 and 93, and thus the holder 23, on which the first and second yoke parts 91 and 93 are mounted. Therefore, the holder 23 and the first frame 24 maintain contact through the first ball bearing part 70, and the first and second frames 24 and 25 maintain contact through the second ball bearing part 80. Therefore, if an external impact, or the like, occurs, the holder 23, the first frame 24, and the second frame 25 maintains gaps therebetween, respectively, increasing the camera module's reliability.

When, a driving signal is not applied to the first and second hand-shake correcting parts 61 and 63, the first and second frames 24 and 25 are fixed without moving in the first direction (X direction) and the second direction (Y direction) by the electrical attractive force. When the driving signal is applied to the first hand-shake correcting part 61, a driving force is generated in the first direction (X direction) by the electromagnetic interaction between the second magnets 61a and the second coils 61b. Since a magnitude of the driving force of the first hand-shake correcting part 61 is greater than that of electrical attractive force between the second magnets 61a and the first yoke parts 91, the first and second frames 24 and 25 move in the first direction (X direction) by the driving force of the first hand-shake correcting part 61. However, when the driving signal applied to the first hand-shake correcting part 61 is removed, the first and second frames 24 and 25 return to their initial positions due to the electrical attractive force between the second magnets 61a and the first yoke parts 91. Here, the initial positions refer to positions at which the first and second frames 24 and 25 are positioned prior to the driving signal being applied to the first hand-shake correcting part 61, and refer to positions including operating errors. The first and second frames 24 and 25 do not always accurately return to the same positions, so the second hall sensor 61c and the third hall sensor 63c are used to determine the position of the first and second frames 24 and 25.

In addition, when the driving signal is applied to the second hand-shake correcting part 63, a driving force is generated in the second direction (Y direction) by the electromagnetic interaction between the third magnet 63a and the third coil 63b. Since a magnitude of the driving force of the second hand-shake correcting part 63 is greater than that of electrical attractive force between the third magnet 63a and the second yoke part 93, the second frame 25 moves in the second direction (Y direction). However, when the driving signal applied to the second hand-shake correcting part 63 is removed, the second frame 25 returns to its initial position through the electrical attractive force between the third magnet 63a and the second yoke part 93. Here, the initial position refers to a position at which the second frame 25 is positioned prior to the driving signal being applied to the second hand-shake correcting part 63, and refers to a position including an operation error. Therefore, since the second frame 25 may not always accurately return to the same position, the third hall sensor 63*c* is used to determine the position of the second frames 25.

Hereinafter, a relationship between the auto-focusing driving part 50 and the hand-shake correcting part 60 will be described. The auto-focusing driving part 50 is arranged perpendicular to the second frame 25, and the hand-shake correcting part 60 is also arranged perpendicular to the second frame. For example, the hand-shake correcting part 60 is disposed along three sides of the second frame.

Through the structure as described above, the two second magnets 61*a* provided in the first hand-shake correcting part 61 are disposed parallel with each other. The third magnet 63*a* provided in the second hand-shake correcting part 63 is disposed in parallel with the first magnet 51 provided in the auto-focusing driving part 50.

For example, the two second magnets 61*a* face each other with the second frame 25 interposed therebetween. In addition, the first magnet 51 and the third magnet 63*a* also face each other with the second frame 25 interposed therebetween.

Therefore, a direction (X direction) in which the two second magnets 61*a* face each other and a direction (Y direction) in which the first magnet 51 and the third magnet 63*a* face each other are perpendicular, and the second frame 25 is enclosed by the first magnet 51, the second magnets 61*a*, and the third magnet 63*a*.

The first magnet 51 of the auto-focusing driving part 50 is provided on the holder 23, and the second magnets 61*a* and the third magnet 63*a* of the hand-shake correcting part 60 are provided on the second frame 25. Since the second frame 25 is accommodated in the holder 23, a distance between the second and third magnets 61*a* and 63*a* and the optical axis may be shorter than that between the first magnet 51 and the optical axis on the plane perpendicular to the optical axis direction (Z direction). Additionally, portions of the holder 23 corresponding to the second magnets 61*a* and the third magnet 63*a* may be open.

The second coils 61*b* and the third coil 63*b* are disposed in the open portions of the holder 23. Therefore, the second magnets 61*a* and the third magnet 63*a* provided on the second frame 25 are disposed to face the second coils 61*b* and the third coil 63*b*, respectively.

Since the first coil 53 is disposed to face the first magnet 51 disposed on one surface of the holder 23, the first coil 53 is positioned on an outer side of the holder 23. Therefore, a distance between the second and third coils 61*b* and 63*b* and the optical axis may be shorter than that between the first coil 53 and the optical axis on the plane perpendicular to the optical axis direction (Z direction). Thus, a distance between the hand-shake correcting part 60 and the optical axis may be shorter than that the distance between the auto-focusing driving part 50 and the optical axis on the plane perpendicular to the optical axis.

Since the first and second frames 24 and 25 are affected by the driving force of the hand-shake correcting part 60 to thereby move and the holder 23 does not move, the first magnet 51 mounted on the holder 23 may not move at the time of correcting the hand-shake. Therefore, the auto-focusing driving part 50 is not affected by the driving force of the hand-shake correcting part 60.

Since the number of members that are to move at the time of correcting the hand-shake decreases, power consumption also decreases. For example, since only the first and second frames 24 and 25 move to correct a hand-shake in the first direction (X direction), only the second frame 25 moves to correct a hand-shake in the second direction (Y direction), and the holder 23 on which the auto-focusing driving part 50 is mounted does not move, the power consumption required for correcting the hand-shake is decreased.

Therefore, reliability against external impacts may be secured and the generation of driving displacement at the time of correcting hand-shake may be prevented. Additionally, power consumption may be decreased.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

As a non-exhaustive example only, a terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

What is claimed is:

1. A camera module comprising:
    a base part;
    a case coupled to the base part to form an internal space;
    a lens module disposed in the internal space; and
    an auto-focusing driving part comprising a first magnet, attached to one surface of the lens module, and a first coil disposed to face the first magnet,
    wherein the base part comprises:
        a first board on which an image sensor is disposed; and
        a fixing part directly mounted on a side portion of the base part, and extending from the base part in an optical axis direction, wherein the first coil is disposed on the fixing part, and
        wherein other side portions of the base part are open.

2. The camera module of claim 1, wherein the lens module is configured to move relative to the case and base part in an optical axis direction.

3. The camera module of claim 1, wherein the base part further comprises:
a sensor housing having a plate shape.

4. The camera module of claim 3, wherein the fixing part comprises a second board, and
the first coil is mounted on the second board, wherein the second board is configured to supply power to the first coil.

5. The camera module of claim 4, further comprising a hand-shake correcting part comprising second and third magnets disposed on the lens module, and second and third coils disposed to face the second and third magnets, respectively, in a direction perpendicular to an optical axis.

6. The camera module of claim 5, wherein the case comprises a third board disposed on an inner surface thereof, and
the second and third coils are disposed on the third board.

7. The camera module of claim 6, wherein the inner surface of the case is spaced apart from the second board in a direction perpendicular to the optical axis, and contacts the third board.

8. The camera module of claim 1, wherein the lens module comprises:
a holder;
first and second frames sequentially disposed in an optical axis direction within the holder; and
a lens barrel fixed to the second frame.

9. The camera module of claim 8, wherein the first and second frames are configured to move relative to the holder in a first direction perpendicular to an optical axis.

10. The camera module of claim 9, wherein the holder and the first frame comprise a first ball bearing part disposed therebetween, wherein the first ball bearing part is configured to roll in the first direction.

11. The camera module of claim 10, wherein the holder and the first frame have first accommodating grooves formed therein, respectively, the first accommodating grooves accommodating the first ball bearing part.

12. The camera module of claim 11, wherein the first accommodating grooves are configured to guide the first ball bearing part in the first direction and limit movement of the first ball bearing part in a direction perpendicular to the first direction.

13. The camera module of claim 9, wherein the second frame is movable relative to the first frame in a second direction perpendicular to both of the optical axis direction and the first direction.

14. The camera module of claim 13, wherein the first and second frames comprise a second ball bearing part disposed therebetween, the second ball bearing part configured to roll in the second direction.

15. The camera module of claim 14, wherein the first and second frames have second accommodating grooves formed therein, respectively, the second accommodating grooves accommodating the second ball bearing part.

16. The camera module of claim 15, wherein the second accommodating grooves guide the second ball bearing part in the second direction and limit movement of the second ball bearing part in a direction perpendicular to the second direction.

17. The camera module of claim 1, wherein the fixing part is not formed on plural side portions of the base part.

18. A camera module comprising:
a base part coupled to a first board on which an image sensor is disposed;
a case coupled to the base part to provide an internal space;
a lens module disposed in the internal space, wherein three magnets are disposed on side surfaces of the lens module; and
three coils disposed to face the three magnets in a direction perpendicular to an optical axis,
wherein one of the three coils is directly mounted on the base part and other coils, of the three coils, are mounted on the case.

19. The camera module of claim 18, wherein the base part comprises:
a sensor housing coupled to the first board, wherein the first board comprises a plate shape; and
a fixing part extending from one side of the sensor housing in an optical axis direction to accommodate the one coil.

20. The camera module of claim 18, wherein only a portion of the base part corresponding to the one coil mounted on the base part has a side wall.

21. The camera module of claim 18, wherein the lens module further comprises a lens barrel disposed therein,
wherein the lens barrel is configured to move in the direction perpendicular to the optical axis, and
the lens module is configured to move in an optical axis direction.

* * * * *